United States Patent [19]

Sola et al.

[11] Patent Number: 5,336,792

[45] Date of Patent: Aug. 9, 1994

[54] PROCESS FOR ENRICHMENT OF FAT WITH REGARD TO POLYUNSATURATED FATTY ACIDS AND PHOSPHOLIPIDS, AND APPLICATION OF SUCH ENRICHED FAT

[76] Inventors: Einar Sola, Svartediksvei 7c, N-5000 Bergen; Jan Røttingen, Ortugrenden 44, N-5033 Fyllingsdalen, both of Norway; Per Grimstad, Seestr. 24, D-2308 Pohnsdorff, Fed. Rep. of Germany; Atle Askeland, Oshaugen 29, N-5000 Bergen, Norway

[21] Appl. No.: 934,680

[22] PCT Filed: Mar. 12, 1990

[86] PCT No.: PCT/NO90/00048

§ 371 Date: Nov. 4, 1992

§ 102(e) Date: Nov. 4, 1992

[87] PCT Pub. No.: WO91/13957

PCT Pub. Date: Sep. 19, 1991

[51] Int. Cl.$^5$ .......................... A23D 5/00; C11B 3/12
[52] U.S. Cl. ........................ 554/21; 426/422; 426/424; 426/425; 426/429; 426/601; 426/805; 554/18
[58] Field of Search ............... 426/429, 425, 424, 422, 426/417, 601, 478, 805; 554/21, 211, 9, 18

[56] References Cited

U.S. PATENT DOCUMENTS

| 4,564,475 | 1/1986 | Masaichiro | 260/398.5 |
| 4,675,132 | 6/1987 | Stout et al. | 260/412 |
| 4,792,418 | 12/1988 | Rubin et al. | 554/211 X |
| 4,874,629 | 10/1989 | Chang et al. | 426/601 |
| 5,130,242 | 7/1992 | Barclay | 426/601 |

Primary Examiner—Arthur C. Prescott
Attorney, Agent, or Firm—Francis C. Hand

[57] ABSTRACT

To enrich fat with polyunsaturated fatty acids and phospholipids a presscake is formed of iced fjord herring containing polyunsaturated fatty acids and phospholipids. The presscake is dissolved in a fat dissolving polar alcohol; the solids are separated; and the liquid evaporated until a precipitation of a first fat fraction occurs. The first fat fraction is separated; and evaporation resumed until the precipitation of a second fat fraction. The second fat fraction, with a higher content of polyunsaturated fatty acids and phospholipids than the first fat fraction, is separated from the remainder of the solution.

7 Claims, No Drawings

PROCESS FOR ENRICHMENT OF FAT WITH REGARD TO POLYUNSATURATED FATTY ACIDS AND PHOSPHOLIPIDS, AND APPLICATION OF SUCH ENRICHED FAT

The present invention relates to a process for enrichment of fat with regard to polyunsaturated fatty acids and phospholipids (PL), whereby the fat is extracted with a fat dissolving, polar alcohol.

It is known that the composition of fatty acids in fat in the diet is important for the prophylaxis of heart diseases and arterioschlerosis, and that it is desirable to use fat with a high content of polyunsaturated fatty acids.

From EP-A-O 175 468 it is known to administer EPA and/or DHA in the treatment and/or prevention of diseases.

It is also known that such acids as part of phospholipids are easier to absorb and ingest in the body.

Very important in this connection are the unsaturated fatty acids:

EPA (eicosapentaenoic acid), denotation C20:5n-3,
DHA (dokosahexaenoic acid), denotation C22:6n-3,
DPA (dokosapentaenoic acid), denotation C22:5n-3.

Most of the marine fish- and mammal species have fat that contains relatively large quantities of EPA and DHA bound in phospholipids.

It has been known, for example, from EP-A/0147509 to process fat by saponification or alcoholysis in order to extract and purify polyunsaturated fatty acids. In such a process, the free fatty acids or methyl or ethyl esters thereof are complexed with urea. In such a process, the fat undergoes a chemical reaction.

With industrial production of lipids from animal- and vegetable materials, experience has learned that it is more difficult to separate phospholipids than triglycerids from body tissues by conventional methods (cooking, pressing, extraction etc.), and that the fat remaining in the tissues will be enriched with phospholipids by such production methods.

From EP-A-O 347 509 it is known a process of extraction and purification of polyunsaturated fatty acids, whereby fat is subjected to saponification or alcoholysis. Thereafter the free fatty acids or methyl or ethyl esters thereof are complexed with urea. This means that the fat undergoes a chemical reaction.

Through extraction with a polar extraction liquid most of the remaining fat can, however, be recovered.

In order to increase the positive effect upon health from this type of fat, it is desirable to enrich the fat with regard to both EPA, DHA, DPA and phospholipids; however, without altering the natural biological structure and properties of the fat.

Such enriched fat will be of great importance not only for the prophylactic effect concerning heart diseases and arteriosclerosis, but also for better nutrition for human and animal lives, especially in the prenatal and the early growth periods.

An adequate supplement of such enriched fat in the diet would assist in securing proper nutriment combinations and thereby noticeably reduce mortality and improve growth conditions for such human and animal lives.

This is of special interest for fish farming, where supplementary quantities of enriched fat in normal feed combinations, at approximate amounts, 0.5 to 1% of the feed, or, referred to the total fat, 10 to 20% of the fat in the feed, could, according to published test reports, probably reduce mortality considerably and increase growth rate by about 10%.

Such enriched fat is according to the invention obtained by the following steps, that the dissolved fat is then precipitated in fractions with increasing content of polyunsaturated fatty acids and phospholipids, through $a_1$) that the liquid solution is concentrated through evaporation until precipitation of the first fat fraction starts, $a_2$) that the first fat fraction is separated, and $a_3$) that further precipitation and concentration are made in steps, through separation of another fat fraction with the start of each following precipitation, whereby the number of precipitated fractions whereby relative quantities at each precipitation can be regulated.

By this process, according to the invention, an adjustable enrichment of EPA, DHA and DPA together with phospholipids is attained without chemical transformation through, for example, esterification of the fatty acids.

Isopropanol is especially suitable as an extraction solvent. It dissolves fat effectively, forms an azeotropic mixture adequate for the process and has good preservation effect.

Ethanol can also be used for this process.

It is essential by this procedure that the last separated fat fractions have, or can be given, a higher enrichment of natural phospholipids and polyunsaturated fatty acids of the type n-3.

According to the invention it has been demonstrated that polyunsaturated fatty acids are being enriched in the later fractions, mainly as phospholipids, i.e. that the saturated fats, mainly as triglycerides, are the first to precipitate during the evaporation. Thereby it becomes possible to produce fat with a high content of phospholipids and polyunsaturated fatty acids, in particular the above-mentioned n-3 fatty acids.

Marine fats are especially rich in the above-mentioned n-3 fatty acids, and it is thus natural to choose fish for raw material, also for reasons that a raw material can be utilised that cannot be used directly for the food and therefore is cheap (industry fish, fish offal etc.).

An example of the invention will be described in the following.

EXAMPLE

Iced fjord herrings of consumption quality (i.e. below 15 mg N per 100 g of herring) were worked into a presscake in the usual way at boiling temperature of 60° C. After pressing, the presscake was passed through a fast chopper, mixed with isopropanol, and stabilised with antioxidant.

The presscake had a water content of about 50%. To 880 g of presscake in a 5 liter flask was added 3080 g of isopropanol, to the effect that the isopropanol content made up about 87.5% of the total for isopropanol plus water, i.e. azeotropic concentration.

The flask content was transferred to a glass with a plastic film as lid and heated to 55° C. in about 1 hour under steady stirring and flushing with nitrogen. Thereafter the suspension was filtered, whereby about 2865 g of filtrate was obtained.

The filtrate was concentrated through evaporation in a vacuum film evaporator until precipitation started, which was registered visually through observing hazing of the solution. 2415 g isopropanol had then evaporated. The rest, 450 g, was centrifugalised, whereby about 6 g of a yellowish substance was obtained (fraction 1).

A second evaporation started wish 430 g solution and was interrupted with a rest of 212 g, as hazing started. The rest was centrifugalised, and the obtained substance was about 2 g (fraction 2).

A third evaporation started with about 192 g and was interrupted with a rest of 115 g as a faint hazing was registered. This rest was centrifugalised. The separated substance was yellowish and weighed 2 g (fraction 3).

A fourth evaporation started with 105 g and was interrupted with a rest of 77 g, as a faint hazing was registered. Centrifugalising did not result in any separate substance, and evaporation was continued until the smell of isopropanol ceased. The residue was brownish and resembled molasses both in colour and consistence. Weight 22 g (fraction 4).

Each fraction (1–4) was analysed. The combination of fatty acids, the sum of saturated, the sum of polyunsaturated, the sum of n-3 fatty acids and the sum of the acids EPA and DHA are shown in table 1 below.

From table 1 it is seen that the sum of EPA+DHA has been raised from 32.36% to 42.19%, i.e. with 30%.

The test was repeated with the same raw material, and this gave about the same result. The analysis did also include finding the content of phospholipids (PL) in the fractions, and as can be seen from table 2, there is a marked increase from 49% in the first to 78% in the last fraction.

Another test was made with same type of raw material, but at a different time of the year. The results are given in table 2 under raw material B. The values for the n-3 fatty acids from this test were somewhat lower, but the increase is relatively much higher: 54.5%, i.e. considerably higher than for raw material A. Raw material B did also show a marked increase in phospholipids from 10% in the first to 86% in the last fraction.

TABLE 1

The fatty acid combination (%) in different fractions after extraction.

| Fatty acids | 1 | 2 | 3 | 4 |
|---|---|---|---|---|
| 12:0 | 0.21 | 0.24 | 0.14 | 0.04 |
| 14:0 | 7.99 | 4.35 | 4.22 | 3.78 |
| 16:0 | 10.54 | 8.08 | 7.67 | 10.77 |
| 18:0 | 2.01 | 1.85 | 1.81 | 1.53 |
| 20:0 | 0.14 | 0.30 | 0.16 | 0.13 |
| 24:0 | trace | 1.05 | 0.21 | 0.18 |
| 16:1 | 4.65 | 3.04 | 3.39 | 3.07 |
| 18:1 | 10.79 | 11.55 | 11.76 | 12.76 |
| 20:1 | 6.94 | 7.59 | 7.10 | 5.87 |
| 22:1 | 8.68 | 11.98 | 9.17 | 6.82 |
| 24:1 | 0.43 | 0.56 | 0.51 | 0.29 |
| 16:2n-4[1] | 0.81 | 0.57 | 0.73 | 0.65 |
| 16:4n-1 | 0.77 | 0.30 | 0.48 | 0.13 |
| 18:2n-6 | 1.49 | 1.14 | 1.10 | 1.06 |
| 18:3n-6 | 0.09 | 0.09 | 0.07 | 0.06 |
| 18:3n-3 | 1.54 | 1.03 | 1.04 | 0.89 |
| 18:4n-3 | 3.26 | 1.47 | 1.64 | 1.04 |
| 20:2n-6 | 0.11 | 0.11 | 0.12 | 0.10 |
| 20:3n-6 | — | — | — | — |
| 20:4n-6 | 1.24 | 0.95 | 0.95 | 0.89 |
| 20:4n-3 | 0.55 | 1.53 | — | — |
| 20:5n-3 | 11.18 | 8.49 | 11.45 | 12.12 |
| 21:5n-2 | trace | 0.19 | 0.20 | 0.29 |
| 22:5n-3 | 0.84 | 0.89 | 0.88 | 0.91 |
| 22:6n-3 | 21.18 | 23.95 | 27.69 | 30.07 |
| Sum saturated | 20.89 | 15.87 | 14.21 | 16.43 |
| Sum the monoenes | 31.49 | 34.72 | 31.93 | 28.81 |
| Sum PUFA[2] | 43.06 | 40.71 | 46.35 | 48.78 |
| Sum n-3-fatty acids | 37.36 | 37.36 | 42.70 | 45.60 |
| Sum EPA + DHA[3] | 32.36 | 32.44 | 39.14 | 42.19 |

TABLE 1-continued

The fatty acid combination (%) in different fractions after extraction.

| Fatty acids | 1 | 2 | 3 | 4 |
|---|---|---|---|---|
| P/S[4] | 2.06 | 2.57 | 3.26 | 2.97 |

[1] n-x, where x states location of first double bond reckoned from the methylene end of the fatty acid
[2] PUFA = polyunsaturated fatty acids
[3] 20:5n-3 (EPA), 22:6n-3 (DHA)
[4] The ratio between sum polyunsaturated (P = PUFA) and saturated (S) fatty acids.

TABLE 2

| Fraction | | Raw material A | | | Raw material B | | |
|---|---|---|---|---|---|---|---|
| | | I | II | III | I | II | III |
| Fatty acids | | | | | | | |
| Sum saturated and the monoenes: | % | 53.7 | 47.8 | 44.1 | 64.9 | 54.7 | 53.6 |
| Sum the polyenes: | % | 46.9 | 52.2 | 55.7 | 35.1 | 45.3 | 46.4 |
| Sum n-3: | % | 37.5 | 40.8 | 46.8 | 25.6 | 34.5 | 35.7 |
| Su EPA-DHA: | % | 32.2 | 37.0 | 43.4 | 20.2 | 29.2 | 31.2 |
| Phospholipids: | % | 49 | 76 | 78 | 10 | 67 | 86 |
| Triglycerides: | % | 51 | 19 | 16 | 89 | 30 | 7 |

We claim:

1. A process for enrichment of fat with polyunsaturated fatty acids and phospholipids, said process comprising the steps of dissolving a fat containing at least a polyunsaturated fatty acid and a phospholipid in a fat dissolving polar alcohol to obtain a liquid solution thereof;

concentrating said liquid solution by evaporation of a part of the alcohol therefrom and to a point at which precipitation of a first fat fraction occurs;

thereafter separating said first fat fraction from the remainder of said liquid solution;

evaporating the remainder of said liquid solution to a point at which precipitation of a second fat fraction occurs; and thereafter separating said second fat fraction from the remainder of said liquid solution to obtain a second fat fraction with a higher content of polyunsaturated fatty acids and phospholipids than said first fat fraction.

2. A process as set forth in claim 1 which further comprises the steps of sequentially repeating said steps of evaporating and separating said remaining liquid solution after separation of said second fat fraction to obtain at least a third fat fraction and a fourth fat fraction wherein each successively obtained fat fraction has a high fatty acid content than a prior fat fraction.

3. A process as set forth in claim 1 wherein the solvent is isopropanol.

4. A process for enrichment of fat with polyunsaturated fatty acids and phospholipids, said process comprising the steps of forming a presscake of iced fiord herring containing polyunsaturated fatty acids and phospholipids;

thereafter dissolving at least a portion of said presscake in a fat dissolving polar alcohol to obtain a liquid solution thereof;

separating undissolved material from said liquid solution;

evaporating said liquid solution to remove at least a part of the alcohol therefrom and to a point at which precipitation of a first fat fraction occurs;

thereafter separating said first fat fraction from the remainder of said liquid solution;

evaporating the remainder of said liquid solution to a point at which precipitation of a second fat fraction occurs; and thereafter separating said second fat fraction from the remainder of said liquid solution to obtain a second fat fraction with a higher content of polyunsaturated fatty acids and phospholipids than said first fat fraction.

5. A process as set forth in claim 4 wherein the solvent is isopropanol.

6. A polyunsaturated fatty acid and phospholipid enriched fat made by the process of claim 4.

7. Use of an enriched fat made by the process of claim 4 as a feed supplement.

* * * * *

UNITED STATES PATENT AND TRADEMARK OFFICE
CERTIFICATE OF CORRECTION

PATENT NO. : 5,336,792
DATED : August 9, 1994
INVENTOR(S) : EINAR SOLA, et al It is certified that error appears in the above-identified patent and that said Letters Patent is hereby corrected as shown below:

```
Column 3, line 4 change "wish" to -with-
Column 6, line 6 change "claim 4" to -claim 1-
   Line 8, change "4" to -1-
```

Signed and Sealed this

Eighth Day of November, 1994

Attest:

BRUCE LEHMAN

*Attesting Officer*     *Commissioner of Patents and Trademarks*